United States Patent [19]

Prudenziati

[11] 4,311,980

[45] Jan. 19, 1982

[54] DEVICE FOR PRESSURE MEASUREMENT USING A RESISTOR STRAIN GAUGE

[75] Inventor: Maria Prudenziati, Modena, Italy

[73] Assignee: Fabrica Italiana Magneti Marelli, S.p.A., Milan, Italy

[21] Appl. No.: 77,541

[22] Filed: Sep. 21, 1979

[30] Foreign Application Priority Data

Oct. 12, 1978 [IT]  Italy .............................. 28682 A/78
Jan. 12, 1979 [IT]  Italy .............................. 19236 A/79

[51] Int. Cl.³ .............................................. G01L 1/22
[52] U.S. Cl. .......................................... 338/4; 338/2;
338/307; 338/308
[58] Field of Search .................... 338/2, 4, 42, 5, 307,
338/308; 29/610 SG, 620; 73/776, 719, 720,
721, 726

[56] References Cited

U.S. PATENT DOCUMENTS

| | | | |
|---|---|---|---|
| 2,438,205 | 3/1948 | Coates | 338/2 |
| 3,049,685 | 8/1962 | Wright, Jr. | 338/2 |
| 3,335,381 | 8/1967 | DiGiovanni | 338/42 X |
| 3,341,794 | 9/1967 | Stedman | 73/720 X |
| 3,456,226 | 7/1969 | Vick | 338/2 |
| 3,479,739 | 11/1969 | Stedman | 29/620 |
| 3,505,634 | 4/1970 | VonVick | 73/720 X |
| 3,876,560 | 4/1975 | Kuo et al. | 338/308 X |
| 3,953,920 | 5/1976 | Endo | 338/2 X |
| 4,160,969 | 7/1979 | Holmes | 29/620 X |

FOREIGN PATENT DOCUMENTS 50-67486  6/1975  Japan .................................. 338/307

OTHER PUBLICATIONS

Morten et al., "Pressure Transducers Employing the Piezo-Resistive Effect. Twenty Years of Research on their Industrial Applications," Fis and Tecnol. (Italy), vol. 1, No. 1, pp. 5-18, Jan-Mar. 1978), Abstract in *Electrical and Electronics Abstracts*, vol. 82, No. 981, Sep. 1979.
Gusev et al., "Film Strain Resistor for Temperatures up to 1000° C.", *Instruments and Experimental Techniques*, vol. 19, No. 2, pt. 2, pp. 564-566, Mar.-Apr., 1976.
Hayden, "Thick-Film Resonant Device", *IBM Tech. Disc. Bull.*, vol. 9, No. 11, Apr. 1967, p. 1651.
Wyatt, "The Design of Discrete, Thick Film Resistors", *Component Technology*, May, 1970.

*Primary Examiner*—C. L. Albritton
*Attorney, Agent, or Firm*—Sughrue, Mion, Zinn, Macpeak and Seas

[57] ABSTRACT

A pressure measurement device and a method for making it are disclosed. A plurality of thick-film resistors are screen-printed onto a deformable substrate, after which they are preferably fired. The resistors are then connected to circuitry for measuring changes in their respective resistances due to deformation of the substrate by an external force or pressure to be measured.

8 Claims, 5 Drawing Figures

DEVICE FOR PRESSURE MEASUREMENT USING A RESISTOR STRAIN GAUGE

BACKGROUND OF THE INVENTION

This invention relates to a device for pressure measurement using a resistor strain gauge, more particularly of the type comprising a deformable substrate subjected to the pressure to be measured having a resistor strain gauge applied thereon, and an electric circuit capable of sensing the changes in resistance of the resistors in accordance with the substrate strain.

In such devices the strain caused by a pressure or load applied to the substrate results in a change in the size of the resistors and electrical properties thereof and accordingly a change in the resistance thereof.

Such a change is sensed by an electric or electronic circuit having the resistors connected thereto, so as to provide signals proportional to the substrate strain and accordingly to the pressure applied thereon.

The presently used devices for measurement of pressures or strains use, as strain gauges, metal wires, continuous metal films, discontinuous metal films, cermets and semiconductors.

The effect of the change in electric resistance of such elements as a result of a strain is commonly referred to as elastoresistance or piezoresistance.

Of course, an ideal strain gauge should have a substantial piezoresistive effect associated with a low thermoresistive effect. More particularly, it should for the first effect (strain sensitivity) have a high gauge factor $$GF = \frac{R - Ro}{\epsilon Ro}$$

(wherein Ro and R are the resistance of the unstrained and strained resistors, respectively, and $\epsilon = \Delta l/l$ is the relative elongation of the element) and for the second effect (thermal stability) low values both of the temperature coefficient of the resistor $$TCR = \frac{\Delta R}{R \Delta T}$$

(wherein $\Delta R/R$ is the relative variation in resistance for a variation in temperature $\Delta T$) and of the temperature coefficient of Gauge factor $$TCGF = \frac{\Delta GF}{GF \Delta T}$$

(wherein $\Delta GF/GF$ is the relative variation of GF for a variation in temperature $\Delta T$).

Generally, the performances of the prior art strain gauges are highly dependent on the structure and composition of the resistors used.

Typical values of the most significant coefficients are shown in the following table, with reference to the conventional strain gauges of the aforementioned types.

TABLE

| Resistors | GF | TCR ppm/°C. | TCGF ppm/°C. | Long term stability |
|---|---|---|---|---|
| Metal wires | 2-5 | 20-4000 | 20-100 | Optimum |
| Continuous metal films | 2-5 | 20-4000 | 20-100 | Good |
| Disc. metal films | 100 | 1000 | — | Very poor |
| Cermet | 100 | 1000 | — | Poor |
| Semiconductors | 40-175 | 400-9000 | 200-5000 | Good |

The comparative analysis of the performances shows that discontinuous metal films and cermets cannot find wide fields of application due to the insufficient time stability of the electric and piezoresistive characteristics. Metal wires and continuous metals films are used where the strain sensitivity (GF) is not a critical requirement, but a good thermal behaviour is essential (low TCR and TCGF), while semiconductors are used for the high strain sensitivity thereof even though, due to the high value of TCR and TCGF, it is often necessary to resort to sophisticated and expensive temperature compensation techniques.

It is a further difficulty in the use of metal film and semiconductor strain gauges to find a good matching between the substrate and strain gauge. Thus, both should have the same thermal linear expansion, coefficient to avoid the arising of apparent strains (not connected with the occurrence of mechanical strains) due to the relative elongations caused by changes in temperature when the substrate and strain gauge are characterized by different coefficients of thermal expansion.

SUMMARY OF THE INVENTION

It is the object of the present invention to provide a resistor strain gauge device for pressure measurement, wherein the resistor strain gauge has a high strain sensitivity, an optimum thermal stability, and very good thermal and mechanical coupling between the resistors and substrate.

According to the invention, these objects are achieved by using a strain gauge comprising one or more thick film resistors screened and fired on a suitable substrate.

DETAILED DESCRIPTION OF THE INVENTION

Figure 1:
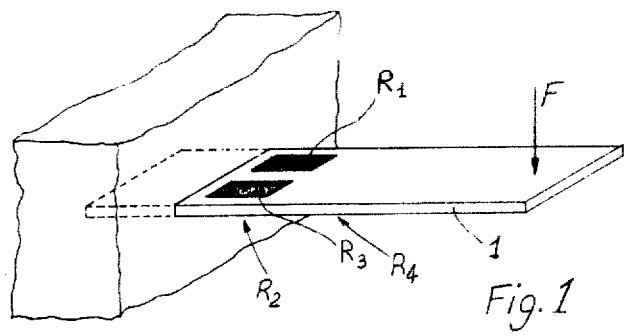
FIG. 1 is a perspective view showing a first embodiment of a resistor strain gauge according to the invention.

Referring to FIG. 1, a suitable substrate 1, for example of ceramic type, is clamped at one edge. At the free edge of the substrate 1a force F is applied, the magnitude of which is to be determined.

According to the invention, a resistor strain gauge applied to such a substrate comprises thick film resistors $R_1$, $R_3$ and $R_2$, $R_4$ deposited by screen printing and firing on the two opposite sides of the substrate 1 adjacent the bond.

It will be seen that resistors $R_1$ and $R_3$ are applied on the top surface of the substrate 1, and resistors $R_2$ and $R_4$ are deposited on the lower surface or underside (not shown) in face-to-face relation with $R_1$ and $R_3$, respectively.

Due to the application of force or load F, the substrate is subjected to a downward strain (bending), which strain is transmitted to the resistors $R_1$, $R_3$ and $R_2$, $R_4$, and accordingly varies the resistance thereof.

Particularly, the resistance in resistors $R_1$ and $R_3$, in an elongated state, will increase, and the resistance in resistors $R_2$ and $R_4$ in a compressed state, will decrease.

Figure 4:
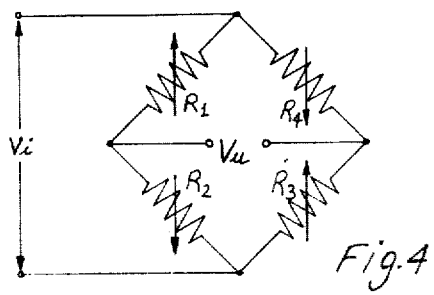
FIG. 4 shows the electric circuit (Wheatstone bridge) for sensing the pressure applied on the substrate.

In order to measure the change in resistance of the resistors as a result of strain and then compute the responsible load F therefrom, the resistors $R_1$, $R_3$ and $R_2$, $R_4$ are connected in a Wheatstone bridge, as shown in FIG. 4. The resistors subjected to the same type of strain are inserted in the opposed arms of the bridge, and the relative upward or downward directed arrows in FIG. 4 show the increasing or decreasing change in resistance of the resistors.

The strain-free resistance of resistors $R_1$, $R_3$ and $R_2$, $R_4$ is the same, so that with unstrained substrate 1 (F=0) the bridge is balanced and no signal appears at output Vu, when a voltage is applied to input Vi.

Of course, upon application of a load on substrate 1 (F≠0), the latter bends, the bridge becomes unbalanced and a signal appears at output Vu. The signal is proportional to the change in resistance of the resistors, and as a result to the strain of substrate 1, that is to the load F.

Herein, reference has been made to a cantilevered beam, but it is apparent that the foregoing is true also in case of a beam clamped on both edges and subjected to a load applied to the central zone thereof.

Figure 2:
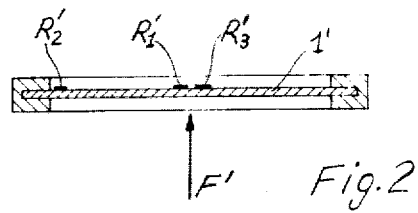
FIG. 2 is a sectional view showing a second embodiment of a strain gauge according to the invention.
Figure 3:
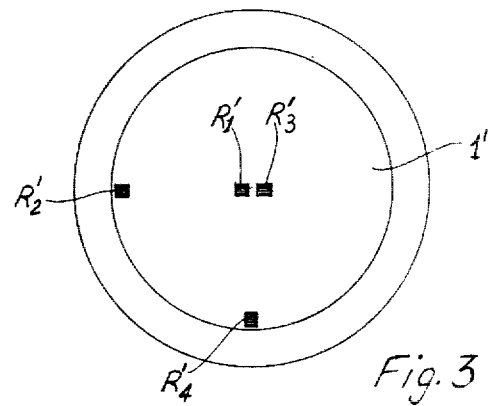
FIG. 3 is a plan view of the strain gauge shown in FIG. 2.

In the modified embodiment of FIGS. 2 and 3, the substrate is in the form of a circular diaphragm 1' clamped all around the edge and the load F' is centrally applied. Instead of being subjected to a concentrated load, the diaphragm could be subjected to a pressure distributed over the surface thereof. In this modified embodiment, the resistors $R_1'$ and $R_3'$ are applied centrally to the diaphragm and are elongated under strain. The resistors $R_2'$ and $R_4'$ are applied on the same side of the substrate 1', but peripherally on the diaphragm, and they are compressed by strain.

The peripheral arrangement for resistors $R_2'$ and $R_4'$ may be as desired, for instance at a spacing of 90° as shown in FIG. 3.

Figure 5:
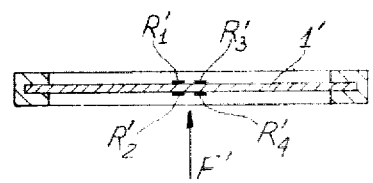
FIG. 5 is a view showing a variant of the embodiment of FIG. 2.

The resistors $R_2'$ and $R_4'$ could be centrally arranged on the other face of substrate 1' in face-to-face relation to resistors $R_1'$ and $R_3'$, as shown in FIG. 5.

In connection with the direction of application of load $F_1'$, the resistance of resistors $R_1'$, $R_3'$ and $R_2'$, $R_4'$ will vary as that of the corresponding resistors $R_1$, $R_3$ and $R_2$, $R_4$ of the embodiment of FIG. 1. Either in the case of the structure of FIG. 1 or that of FIGS. 2 and 5, it clearly appears that the number and arrangement of the resistors may vary as desired to enhance the strain sensitivity. Thus, the resistors are located at the locations of maximum strain for the substrate.

However, in the case of an edge-clamped diaphragm, it may be useful to locate all the resistors at the central zone, as shown in FIG. 5, to provide maximum sensitivity of the system even in the case of a diaphragm not correctly clamped to the edge.

The above disclosure refers to loads F and F' applied at one side of substrates 1 and 1', but it is apparent that these loads or forces could be the resultant of opposite forces applied to the two sides of the substrate, in which case the signal provided by the Wheatstone bridge would relate to differential loads or pressures.

The strain and pressure sensors shown in FIGS. 1, 2 and 5 result in improving the manufacture technology of this type of sensors.

As above mentioned, the active portion, that is the strain gauge element, comprises thick film resistors deposited by screen printing on insulating substrates and fired according to conventional methods of thick film resistors for hybrid microcircuits. There are many screenable inks providing thick film resistors with suitable strain sensitivity.

Generally, such inks comprise a dielectric component and a conductive component. The dielectric component or matrix may comprise a borosilicate, leadborosilicate, aluminosilicate or lead silicate type of glass with possible small additions of oxides, such as $CdO$, $Ga_2O_3$, $Al_2O_3$, etc.

The conductive component may be a noble metal (Ag, Au, Pd) or an oxide or mixture thereof (such as PdO, PdO/Ag), or a conductive oxide of a noble metal (such as $RuO_2$, $Bi_2Ru_2O_7$, $Rb_2Ru_2O_6$, $TlO_2$, $IrO_2$, etc.).

The piezoresistive properties have been measured for resistors made of inks of different formulations and it was found that the lower the concentration of conductor in the ink, the higher are the resistivity of the resistor and the Gauge factor of the strain gauge produced.

The thick film resistors have good Gauge factors, for instance GF=10-15, low thermal coefficients of the resistance TCR≦30-200ppm/°C. and low thermal coefficients of the Gauge factor: TCGF≦100-400 ppm/°C. with an excellent stability and high fatigue limit for many strain cycles.

Therefore, the strain sensitivity (GF) is intermediate between that of metal wire strain gauges, which is the lowest, and that of semiconductor strain gauges, which is the highest.

Additionally, the temperature stability (TCR, TCGF) is comparable with that of the metal wires, which are the most stable and substantially better than that of semiconductors.

An advantage in using screen printed resistors is that they have a positive value of Gauge factor when subjected to transverse and longitudinal strains relative to the resistor direction. As a result, the resistors deposited centrally of the diaphragm in a diaphragm pressure measuring device (FIGS. 2 and 5) and then simultaneously subjected to transverse and longitudinal strain would double the strain sensitivity thereof.

The strain gauges may be made by depositing the resistors on different substrates having different mechanical properties. Different ceramics, such as alumina, borillia, zirconia, as well as enameled metal sheets, are well suited to the purpose.

Hereinafter some examples are given for the performances of pressure and strain measurement devices.

By applying to the cantilever structure of FIG. 1 such a load as to cause a maximum strain in the four resistors connected in a bridge configuration of 2000 μmm/mm, an output signal is obtained at Vu of 25-30 mV/V with borosilicate and $Bi_2Ru_2O_7$ glass resistors having a layer resistivity of 10 KΩ/□. By applying in the diaphragm structure of FIGS. 2 and 5 such a pressure as to induce at the diaphragm edges a strain of 2000 μmm/mm, with four bridge connected resistors an output signal is provided of 25-30 mV/V with borosilicate and $Bi_2Ru_2O_7$ glass resistors having a layer resistivity of 10 KΩ/□.

The most important advantages for the embodiment of the strain and pressure sensors according to the present invention may be summarized as follows.

No bonding agent is required between the strain gauge and beam or diaphragm since the piezoresistive resistor is provided directly by screen printing on the substrate acting as a beam or diaphragm. Moreover, a proper matching is provided for the coefficients of expansion of the substrates and screen printed resistors.

There is also the possibility of trimming the resistance values for the screen printed and fired resistors (or, as a possible alternative, compensation resistors obtained by the same technique but not subjected to strain, connected in parallel or in series with one of the Wheatstone bridge sides) by laser or sand blasting in order to ensure a zero output from the bridge of Wheatstone in the absence of strain or pressure on the substrate. At zero strain, output signals $\leq 100$ $\mu$V/V can be readily obtained from the Wheatstone bridge.

Finally, bridges can be made with input and output impedances within a wide range of values by suitably selecting the geometry and layer resistivity of the resistors.

The technology for the realization of strain gauges, similar to that of hybrid circuits for microelectronics, is rather simple and inexpensive and accordingly adapted for large scale production.

Of course, the above described device for pressure measurement or pressure sensor is applicable to all cases where a strain sensor of high sensitivity and excellent thermal stability is required.

Therefore, it can be conveniently applied in the automotive field for control of injection, ignition, and phase control and for hydraulic systems.

A pressure sensor was herein referred to, but the invention also relates to a strain gauge per se, using thick film resistors for measuring and controlling physical magnitudes, such as strain, pressure, force or load, torsional momentum, etc.

Changes and modifications can be made in accordance with practical requirements as will be clear to those skilled in the art, without departing for this from the scope of the invention.

What is claimed is:

1. In a device for pressure measurement of the type comprising a deformable substrate subjected to a pressure to be measured, a strain gauge disposed on said substrate, and electric circuit means connected with said strain gauge for sensing changes in the electrical resistance of said strain gauge as a function of the substrate formation, wherein said strain gauge is comprised of at least one thick film resistor having a strain gauge factor of at least 10 deposited on said substrate.

2. In a device for pressure measurement according to claim 1, wherein said substrate has two major surfaces on opposite sides of said substrate and a plurality of thick film resistors are applied to at least one of said surfaces at strain sensitive locations.

3. In a device for pressure measurement according to claim 2, wherein said substrate is comprised of a cantilever clamped at one edge and wherein a first pair of thick film resistors is located on one of said surfaces and another pair of said thick film resistors is located on the other of said surfaces at a position directly opposite said first pair of thick film resistors.

4. In a device for pressure measurement according to claim 2, wherein said substrate is comprised of a diaphragm having a central zone and a clamped edge portion and wherein a first pair of thick film resistors is located on one surface of said diaphragm in said central zone and another pair of thick film resistors is located on said edge portion of said one face of said diaphragm.

5. In a device for pressure measurement according to claim 2, wherein said substrate is comprised of a diaphragm having a central zone and a clamped edge portion and wherein a first pair of thick film resistors is located on one surface of said diaphragm in said central zone thereof and another pair of thick film resistors is located on the other surface of said diaphragm at a position directly opposite said first pair of thick film resistors.

6. In a device for pressure measurement according to any one of the preceding claims, wherein said thick film resistors are formed by screen printing with an ink comprising at least one member of the group consisting of $RuO_2$, $IrO_2$, $TlO_2$, $Bi_2Ru_2O_7$, $Pb_2Ru_2O_7$, Au, Pd and alloys thereof, in a dielectric matrix.

7. In a device for pressure measurement according to claim 6, wherein said dielectric matrix is a member of the group consisting of borosilicate glass, alumina-silicates, lead borosilicates and lead silicates.

8. In a device for pressure measurement according to claim 7, wherein said substrate is a material of the group consisting of alumina, beryllia, zirconia and enameled metals.

* * * * *